(12) United States Patent
Lee

(10) Patent No.: US 12,003,496 B2
(45) Date of Patent: Jun. 4, 2024

(54) SYSTEM AND METHOD FOR AUTONOMOUSLY OPERATING PUBLIC LEDGER-BASED CREDENTIAL

(71) Applicant: DATA ALLIANCE CO., LTD., Seoul (KR)

(72) Inventor: Kwang Bum Lee, Bucheon-si (KR)

(73) Assignee: DATA ALLIANCE CO., LTD., Seoul (KR)

( * ) Notice: Subject to any disclaimer, the term of this patent is extended or adjusted under 35 U.S.C. 154(b) by 390 days.

(21) Appl. No.: 17/432,732

(22) PCT Filed: Feb. 25, 2019

(86) PCT No.: PCT/KR2019/002268
§ 371 (c)(1),
(2) Date: Aug. 20, 2021

(87) PCT Pub. No.: WO2020/171273
PCT Pub. Date: Aug. 27, 2020

(65) Prior Publication Data
US 2022/0116377 A1  Apr. 14, 2022

(30) Foreign Application Priority Data
Feb. 22, 2019 (KR) .................. 10-2019-0021389

(51) Int. Cl.
*H04L 9/40* (2022.01)
*H04L 9/00* (2022.01)
(Continued)

(52) U.S. Cl.
CPC ............ *H04L 63/08* (2013.01); *H04L 9/0825* (2013.01); *H04L 9/0866* (2013.01);
(Continued)

(58) Field of Classification Search
None
See application file for complete search history.

(56) References Cited

U.S. PATENT DOCUMENTS

2008/0162928 A1  7/2008  Qiu et al.
2014/0245409 A1  8/2014  Falk et al.
(Continued)

FOREIGN PATENT DOCUMENTS

KR  1020100126291 A  12/2010
KR  1020120094926 A   8/2012
(Continued)

OTHER PUBLICATIONS

Dahye Shin et al., "Smart Contract Security for Fintech", Korea Information Processing Society Review, Sep. 2015, pp. 54-62, vol. 22, No. 5.

*Primary Examiner* — Benjamin E Lanier
*Assistant Examiner* — Felicia Farrow
(74) *Attorney, Agent, or Firm* — Rabin & Berdo, P.C.

(57) ABSTRACT

In a system and a method for autonomously operating a public ledger-based credential, the method includes registering credential issuance authority information in a public ledger of a blockchain platform, and verifying a credential issued to a first computing device by referring to the credential issuance authority information registered in the public ledger. The credential issuance authority information includes an attribute value range assigned to a credential issuer and public key information of the credential issuer. A second computing device verifies the credential issued to the first computing device by referring to the credential issuance authority information registered in the public ledger.

18 Claims, 4 Drawing Sheets

(51) Int. Cl.
  *H04L 9/08* (2006.01)
  *H04L 9/32* (2006.01)
(52) U.S. Cl.
  CPC .......... *H04L 9/3242* (2013.01); *H04L 9/3247* (2013.01); *H04L 9/50* (2022.05)

(56) References Cited

U.S. PATENT DOCUMENTS

| | | | | |
|---|---|---|---|---|
| 2018/0097779 A1* | 4/2018 | Karame | ................ | H04L 9/3236 |
| 2018/0167222 A1 | 6/2018 | Grajek et al. | | |
| 2018/0349621 A1* | 12/2018 | Schvey | ................... | H04L 63/04 |
| 2019/0230073 A1* | 7/2019 | Patel | .................. | G06Q 20/3674 |
| 2020/0050797 A1* | 2/2020 | Suh | .......................... | H04L 9/50 |

FOREIGN PATENT DOCUMENTS

| | | | | |
|---|---|---|---|---|
| KR | 101680260 B1 | 11/2016 | | |
| KR | 101817152 B1 | 2/2018 | | |
| KR | 1020180089668 A | 8/2018 | | |
| KR | 101903620 B1 * | 10/2018 | ........... | H04L 9/3263 |
| KR | 1020180125630 A | 11/2018 | | |

\* cited by examiner (PRIOR ART)

centralized hierarchical structure signature chain structure

SYSTEM AND METHOD FOR AUTONOMOUSLY OPERATING PUBLIC LEDGER-BASED CREDENTIAL

TECHNICAL FIELD

The present disclosure relates to a system and a method for operating a credential, and more particularly, to a system and a method for autonomously operating a public ledger-based credential.

BACKGROUND ART

FIG. 1 is a diagram illustrating a related structure for issuing and verifying credentials.

The related structure for issuing and verifying credentials has a centralized hierarchical structure as illustrated in FIG. 1. In such a related centralized structure, a root-level issuer has problems such as information asymmetry, a single point of failure, and so on.

SUMMARY

Technical Problem

A technical objective to be achieved by the present disclosure is to provide a decentralized system and method for autonomously operating a public ledger-based credential, according to which a credential issuer can, without a root-level issuer, autonomously issue a credential within a range of attribute values assigned to the credential issuer to an immediate sub-object, and external subjects can verify legitimacy of the issued credential.

Technical Solution

According to an embodiment of the present disclosure, there is provided a method for autonomously operating a public ledger-based credential, including registering credential issuance authority information in a public ledger of a blockchain platform, and verifying a credential issued to a first computing device by referring to the credential issuance authority information registered in the public ledger.

According to another embodiment of the present disclosure, there is provided a method for autonomously operating a public ledger-based credential, including requesting a smart contract to generate a credential issuance authority, wherein the smart contract is deployed on a blockchain platform and generates credential issuance authority information, and issuing a credential to satisfy the credential issuance authority information generated by the smart contract and registered in the public ledger of the blockchain platform, and providing the issued credential to a first computing device.

The credential may include an attribute value for a predetermined attribute item.

The credential issuance authority information may include an attribute value range assigned to a credential issuer with respect to the predetermined attribute item, and public key information of the credential issuer.

The credential issued to the first computing device may include the credential issuer information, an attribute value assigned to the credential issued to the first computing device, and an electronic signature of the credential issuer.

The credential issuance authority information may further include credential issuer information and credential valid period information.

The credential issuance authority information may be generated in at least one node included in the blockchain platform when a smart contract deployed on the blockchain platform is executed according to a request of the credential issuer.

The generated credential issuance authority information may be registered in the public ledger through distributed consensus by nodes included in the blockchain platform.

The credential issuer may uniquely assign the first computing device with an attribute value for the predetermined attribute item, in which the attribute value may be within the attribute value range assigned to the credential issuer.

The predetermined attribute item may be one of Device Address, Device Extended Unique Identifier (EUI), IP Address, and Universally Unique Identifier (UUID).

According to an embodiment of the present disclosure, there is provided a system for autonomously operating a public ledger-based credential, including a blockchain platform that stores a public ledger in which credential issuance authorization information is registered, and a second computing device that verifies a credential issued to the first computing device by referring to the credential issuance authority information registered in the public ledger.

According to another embodiment of the present disclosure, there is provided a system for autonomously operating a public ledger-based credential, including a credential issuer terminal that requests a smart contract to generate a credential issuance authority, wherein the smart contract is deployed on a blockchain platform and generates credential issuance authority information, and issues a credential to satisfy the credential issuance authority information generated by the smart contract and registered in the public ledger of the blockchain platform, and provides the issued credential to a first computing device.

Advantageous Effects

According to the present disclosure, a credential issuer can, without a root-level issuer, autonomously issue a credential within the attribute value range which is assigned to the credential issuer, to an immediate sub-object. Further, external subjects can verify legitimacy of the credentials obtained through an unreliable communication path.

DETAILED DESCRIPTION

Figure 1:
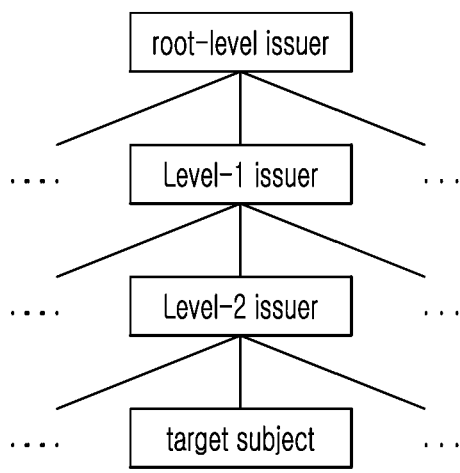
FIG. 1 is a diagram illustrating a related structure for issuing and verifying credentials.
Figure 1:
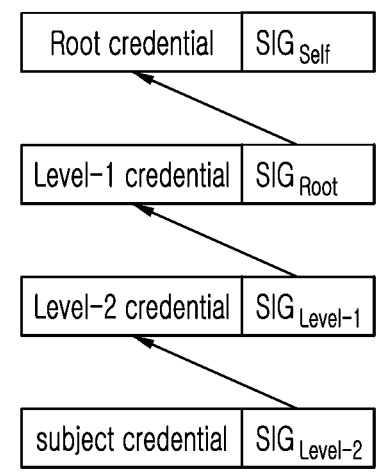

Hereinafter, preferred embodiments of the present disclosure will be described in detail with reference to the accompanying drawings so that those with ordinary knowledge in the art can easily achieve the present disclosure. However, the description proposed herein is just a preferable example for the purpose of illustrations only, not intended to limit the scope of the disclosure, so it should be understood that other equivalents and modifications could be made thereto without departing from the scope of the disclosure. In the following description, the functions or elements irrelevant to the present disclosure will not be described for the sake of clarity, and the like reference numerals are used to denote the same or similar elements in the description and drawings.

Throughout the description, when a portion is stated as "comprising (including)" an element, unless specified to the contrary, it intends to mean that the portion may additionally include another element, rather than excluding the same.

In addition, the terms "unit" and "module" described herein mean a unit of processing at least one function or operation, and may be implemented as hardware or software or combination of hardware and software.

Figure 2:
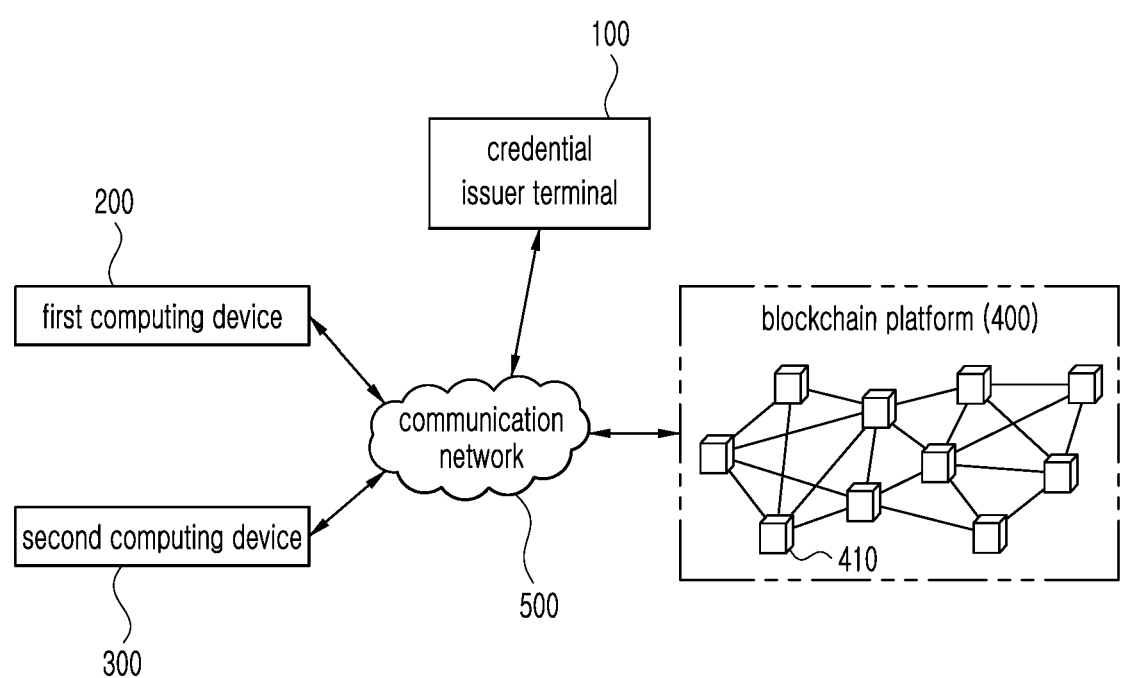
FIG. 2 illustrates a configuration of a system for autonomously operating a public ledger-based credential according to an embodiment of the present disclosure.

FIG. 2 illustrates a configuration of a system for autonomously operating a public ledger-based credential according to an embodiment of the present disclosure.

Referring to FIG. 2, the system for autonomously operating a public ledger-based credential according to the present disclosure may include a credential issuer terminal 100, a first computing device 200, a second computing device 300, and a blockchain platform 400.

For convenience of explanation, FIG. 2 illustrate one credential issuer terminal 100, one first computing device 200, and one second computing device 300 by way of example. According to an embodiment, the system for autonomously operating a public ledger-based credential according to the present disclosure may include a plurality of credential issuer terminals 100, the first computing devices 200, and the second computing devices 300.

The credential issuer terminal 100, the first computing device 200, the second computing device 300, and the blockchain platform 400 may exchange various types of information and data through a communication network 500.

The communication network 500 includes a local area network (LAN), a metropolitan area network (MAN), a wide area network (WAN), the Internet, 2G, 3G, 4G, 5G mobile communication networks, Bluetooth, Wi-Fi, Wibro, satellite communication networks, LPWA (Low Power Wide Area) network such as LoRa, Sigfox, and so on. Further, the communication method is not limited to whether it is wire or wireless, and any communication method may be used.

The credential issuer terminal 100, the first computing device 200, and the second computing device 300 may include a notebook computer, a desktop device, a laptop computer, a server computer, a smartphone, a tablet computer, a network server, a gateway device. and so on, but not limited thereto, and may include all types of devices with a processor and communication means.

The credential issuer terminal 100 is a device used by a credential issuer. The credential issuer may herein issue a credential to his or her sub-object device.

The credential may include credential issuer information, credential attribute information, and an electronic signature of the credential issuer. The credential attribute information may include one or more attribute items. The credential issuer may issue a credential by assigning an attribute value for a predetermined attribute item, which is within an attribute value range previously assigned to the credential issuer. For example, when the predetermined attribute item included in the credential is an IP address and the IP address range assigned to the credential issuer is '192.168.15.1~192.168.15.24', the credential issuer may issue a credential by assigning an IP address belonging to the corresponding IP address range. This may be appliable not only to the IP address, but also any data that can be expressed in the form of a numerically inclusive relationship.

The credential issuer may assign the sub-object device with a unique identifier within the range assigned to the credential issuer, and issue a credential including the unique identifier assigned to the corresponding device. For example, when the credential issuer is a LoRa device manufacturer, the LoRa device manufacturer may issue a credential by assigning a LoRa device manufactured by himself with a device Extended Unique Identifier (EUI) within a range assigned to the LoRa device manufacturer. Alternatively, a LoRa network provider may issue a credential by assigning a device address during a process of opening call of a LoRa device.

The first computing device 200 may receive the credential from the credential issuer and provide it according to a request of the second computing device 300.

The second computing device 300 may receive the credential from the first computing device 200 and verify the same.

The blockchain platform 400 represents a P2P structure network including a plurality of nodes 410 operating according to blockchain algorithms. The nodes 410 herein represent the subjects that participate in the blockchain network and maintain and manage blockchain data based on the blockchain algorithms. The node 410 may be implemented as a computing device, but may also be implemented as a virtual machine or the like.

In response to a request to process transaction generated in the blockchain, each node 410 of the blockchain platform 400 verifies the validity of the transaction, records the verified transaction in new block data, and propagates to each node 410 of the blockchain platform 400. The transaction may herein include processing various types of information generated on the blockchain platform 400.

Each node 410 of the blockchain platform 400 stores blockchain data that is a public ledger shared by distributed consensus algorithms determined respectively, and the blockchain data may be formed in a chain form in which a plurality of block data are linked.

Credential issuance authority information may be registered on the public ledger stored in the blockchain platform 400 according to the present disclosure. The credential issuance authority information will be described in more detail below.

Meanwhile, the blockchain platform 400 may provide a so-called "smart contract" function and a "dApp" (decentralized application) function based on the smart contract.

The smart contract herein is a program code that is deployed on the blockchain platform 400 and executed as being included in the block of the blockchain data. The smart contract may be executed by external applications or services or other smart contracts.

Each node 410 of the blockchain platform 400 may include a virtual machine for executing the smart contract. For this purpose, although it may vary depending on embodiments, the smart contract may be compiled into byte code executable in a virtual machine, and deployed on the blockchain platform 400 and stored in the blockchain data. The byte code of the smart contract may be substituted for the Op code in the virtual machine and executed.

The smart contract that generates the credential issuance authority information according to a request of the credential issuer may be executed on the blockchain platform 400.

Figure 3:
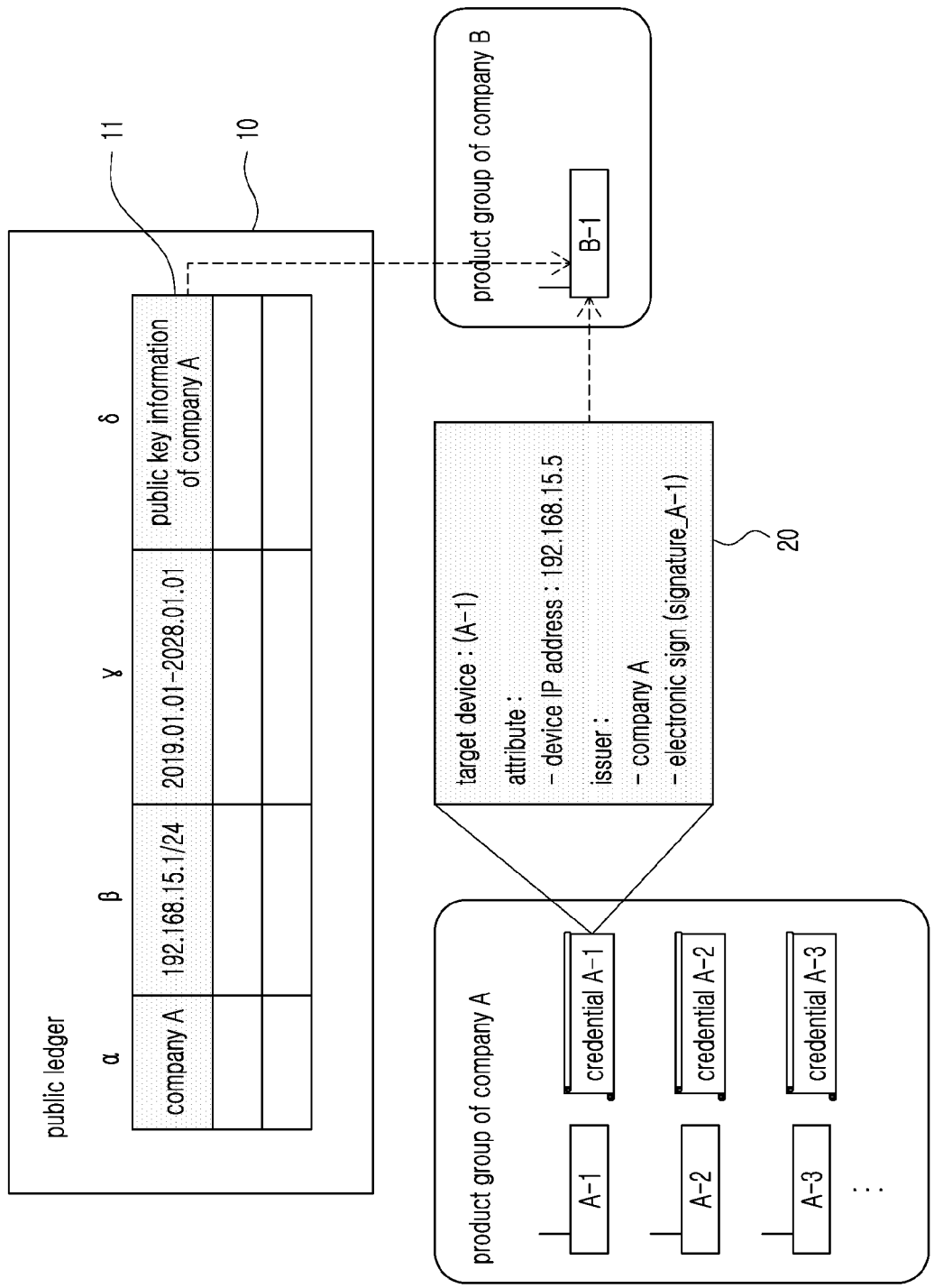
FIG. 3 is a diagram conceptually illustrating how a public ledger-based credential is autonomously operated according to an embodiment of the present disclosure.

FIG. 3 is a diagram conceptually illustrating how a public ledger-based credential is autonomously operated according to an embodiment of the present disclosure.

Referring to FIG. 3, a public ledger 10 is stored in the blockchain platform 400. Further, the credential issuance authority information may be stored in the public ledger 10 through the distribution consensus of each node 410 of the blockchain platform 400.

The credential issuance authority information may include credential issuer information ($\alpha$), a range ($\beta$) of attribute value assigned to the credential issuer, credential valid period information ($\gamma$), and public key information ($\delta$) of the credential issuer.

For example, when 'Company A' sends a request to generate a credential issuance authority along with the public key information of the 'Company A' through the credential issuer terminal 100 thereof, the smart contract may generate the credential issuance authority information of the 'Company A'. According to an embodiment, the 'Company A' may request to generate a credential issuance authority with a payment in token or cryptocurrency used in the blockchain platform 400.

FIG. 3 illustrates that credential issuance authority information 11 is registered, stating that $\alpha$ is 'Company A', $\beta$ is '192.168.15.1~192.168.15.24', $\gamma$ is '2019.01.01~2028.01.01', and $\delta$ is 'Public key of Company A'.

The 'Company A' may issue a credential to a sub-object device by uniquely assigning an IP address within the IP address range of '192.168.15.1~192.168.15.24' assigned to the 'Company A'. FIG. 3 illustrates that 'credential A-1', 'credential A-2', and 'credential A-3' are issued respectively to devices A-1, A-2, and A-3 (corresponding to the first computing device 200 in FIG. 1), which are product lines of the Company A.

The 'credential A-1' 20 issued to the device A-1 may include an IP address (192.168.15.5) and credential issuer information (Company A), and further include an electronic signature (signature_A-1) using the private key of the 'Company A'.

It is assumed that a device B-1 (corresponding to the second computing device 300 of FIG. 1) belongs to a product line manufactured by Company B. Even when the device B-1 receives the 'credential A-1' 20 from the device A-1 through an unreliable communication path, the device B-1 may verify legitimacy of the 'credential A-1' 20 with reference to the public ledger 10 of the blockchain platform 400.

The device B-1 confirms the credential issuer information ($\alpha$) in the 'credential A-1' 20, and confirms the credential issuance authority information 11 of the Company A registered in the public ledger 10. Further, the device B-1 confirms that the IP address included in the 'credential A-1' 20 is '192.168.15.5' and within the attribute value range ($\beta$) assigned to the Company A. Further, the device B-1 may confirm it by using the credential valid period information ($\gamma$). Further, the device B-1 may confirm an electronic signature (signature_A-1) by using the public key information ($\delta$) of the Company A.

The example in which the credential issuer is a device manufacturer has been described with reference to FIG. 3. It is to be noted that, as described above, the credential issuer may be a network provider that owns or manages resources of the network.

Figure 4:
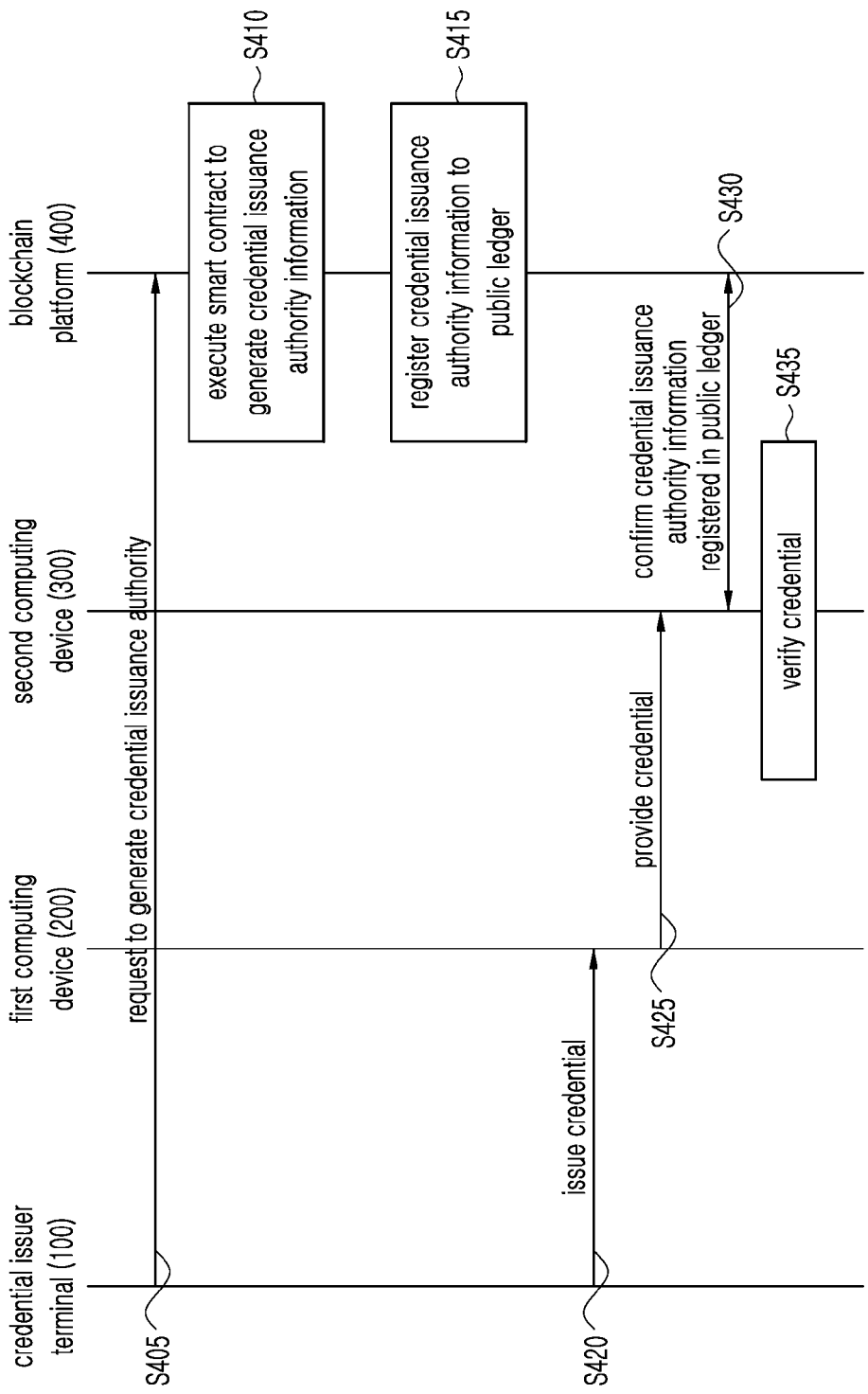
FIG. 4 is a flowchart illustrating a process of autonomously operating a public ledger-based credential according to an embodiment of the present disclosure.

FIG. 4 is a flowchart illustrating a process of autonomously operating a public ledger-based credential according to an embodiment of the present disclosure.

Referring to FIGS. 2 to 4, when a request to generate a credential issuance authority from the credential issuer terminal 100 at S405 is received, a smart contract deployed on the blockchain platform 400 and generating credential issuance authority information may be executed in at least one node 410 of the blockchain platform 400 to generate credential issuance authority information, at S410.

The smart contract may be implemented as a code that is programmed to automatically generate corresponding credential issuance authority information according to a predetermined rule when the request to generate a credential issuance authority transmitted from the credential issuer terminal 100 satisfies a predetermined condition.

As illustrated in FIG. 2, the credential issuance authority information may include the credential issuer information ($\alpha$), the range ($\beta$) of attribute value assigned to the credential issuer, the credential valid period information ($\gamma$), and the public key information ($\delta$) of the credential issuer.

At S405, the credential issuer terminal 100 may transmit the credential issuer information ($\alpha$) and the public key information ($\delta$) of the credential issuer to the smart contract. The attribute value range ($\beta$) and the credential valid period information ($\gamma$) assigned to the credential issuer may be determined according to a predetermined rule in the smart contract.

Next, the credential issuance authority information generated at S410 may be registered in the public ledger 10 through a distributed consensus process by the participating nodes 410 of the blockchain platform 400, at S415.

Thereafter, the credential issuer may issue a credential by assigning an attribute value within the attribute value range assigned to the credential issuer, at S420. While FIG. 3 illustrates that the credential issuer terminal 100 issues the credential to the first computing device 200, it is also possible that the credential is issued to the first computing device 200 through another device of the credential issuer.

Next, the first computing device 200 may provide the credential issued to itself to the second computing device 300, at S425.

Then, the second computing device 300 confirms the credential issuance authority information registered in the public ledger 10 of the blockchain platform 400, at S430. Further, the credential issued to the first computing device 200 may be verified with reference to the credential issuance authority information registered in the public ledger 10, at S435.

The embodiments described above may be implemented as a hardware component, a software component, and/or a combination of a hardware component and a software component. For example, the devices, methods, and components described in the embodiments may be implemented by using one or more general computer or specific-purpose computer such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, although it is described in certain examples that one processing device is used, one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing unit, or instruct the processing unit independently or collectively to operate as desired. Software and/or data may be interpreted by the processing device or, in order to provide instructions or data to the processing device, may be embodied in any type of machine, component, physical device, virtual equipment, computer storage medium or device, or signal wave transmission, permanently or temporarily. The software may be distributed over networked computer systems and stored or executed in a distributed manner. The software and data may be stored on one or more computer-readable recording media.

The method according to the embodiments may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of program instructions include high-level language codes that may be executed by a computer using an interpreter, and so on as well as machine language codes such as those generated by a compiler. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are executed in an order different from the described method, and/or even when the components of the system, structure, device, circuit, and the like are coupled or combined in a form different from the way described, or replaced or substituted by other components or equivalents, an appropriate result can be achieved.

What is claimed is:

1. A method for autonomously operating a public ledger-based credential, comprising:
    registering credential issuance authority information in a public ledger of a blockchain platform; and
    verifying a credential issued to a first computing device by referring to the credential issuance authority information registered in the public ledger, wherein
    the credential comprises an attribute value for a predetermined attribute item, and
        the credential issuance authority information comprises an attribute value range assigned to a credential issuer with respect to the predetermined attribute item, and public key information of the credential issuer, and
    wherein the credential issuer uniquely assigns the first computing device with the attribute value for the predetermined attribute item, wherein the attribute value is within the attribute value range assigned to the credential issuer.

2. The method of claim 1, wherein the credential issued to the first computing device comprises credential issuer information, the attribute value assigned to the credential issued to the first computing device, and an electronic signature of the credential issuer.

3. The method of claim 2, wherein the credential issuance authority information further comprises the credential issuer information and credential valid period information.

4. The method of claim 3, wherein
    the credential issuance authority information is generated in at least one node included in the blockchain platform by executing a smart contract deployed on the blockchain platform according to a request of the credential issuer, and
    the generated credential issuance authority information is registered in the public ledger through distributed consensus by nodes included in the blockchain platform.

5. A method for autonomously operating a public ledger-based credential, comprising:
    requesting a smart contract to generate a credential issuance authority, wherein the smart contract is deployed on a blockchain platform and generates credential issuance authority information; and
    issuing a credential to satisfy the credential issuance authority information generated by the smart contract and registered in the public ledger of the blockchain platform, and providing the issued credential to a first computing device, wherein
    the credential comprises an attribute value for a predetermined attribute item, and
        the credential issuance authority information comprises an attribute value range assigned to a credential issuer with respect to the predetermined attribute item, and public key information of the credential issuer, and
    wherein the credential issuer uniquely assigns the first computing device with the attribute value for the predetermined attribute item, wherein the attribute value is within the attribute value range assigned to the credential issuer.

6. The method of claim 5, wherein the credential issued to the first computing device comprises credential issuer information, the attribute value assigned to the credential issued to the first computing device, and an electronic signature of the credential issuer.

7. The method of claim 6, wherein the credential issuance authority information further comprises the credential issuer information and credential valid period information.

8. The method of claim 7, wherein
    the credential issuance authority information is generated in at least one node included in the blockchain platform by executing a smart contract deployed on the blockchain platform according to a request of the credential issuer, and
    the generated credential issuance authority information is registered in the public ledger through distributed consensus by nodes included in the blockchain platform.

9. The method of claim 8, wherein the predetermined attribute item is one of Device Address, Device Extended Unique Identifier (EUI), IP Address, and Universally Unique Identifier (UUID).

10. A system for autonomously operating a public ledger-based credential, comprising:

a blockchain platform that stores a public ledger in which credential issuance authorization information is registered; and a processor that verifies a credential issued to a first computing device by referring to the credential issuance authority information registered in the public ledger, wherein the credential comprises an attribute value for a predetermined attribute item, and the credential issuance authority information comprises an attribute value range assigned to a credential issuer with respect to the predetermined attribute item, and public key information of the credential issuer, and wherein the credential issuer issues a credential by uniquely assigning the first computing device with the attribute value within the attribute value range assigned to the credential issuer.

11. The system of claim 10, wherein the credential issued to the first computing device comprises credential issuer information, the attribute value assigned to the credential issued to the first computing device, and an electronic signature of the credential issuer.

12. The system of claim 11, wherein the credential issuance authority information further comprises the credential issuer information and credential valid period information.

13. The system of claim 12, wherein the credential issuance authority information is generated in at least one node included in the blockchain platform by executing a smart contract deployed on the blockchain platform according to a request of the credential issuer, and the generated credential issuance authority information is registered in the public ledger through distributed consensus by nodes included in the blockchain platform.

14. A system for autonomously operating a public ledger-based credential, comprising a credential issuer terminal that requests a smart contract to generate a credential issuance authority, wherein the smart contract is deployed on a blockchain platform and generates credential issuance authority information, and issues a credential to satisfy the credential issuance authority information generated by the smart contract and registered in the public ledger of the blockchain platform, and provides the issued credential to a first computing device, wherein the credential comprises an attribute value for a predetermined attribute item, and the credential issuance authority information comprises an attribute value range assigned to a credential issuer with respect to the predetermined attribute item, and public key information of the credential issuer, and wherein the credential issuer issues a credential by uniquely assigning the first computing device with the attribute value within the attribute value range assigned to the credential issuer.

15. The system of claim 14, wherein the credential issued to the first computing device comprises credential issuer information, the attribute value assigned to the credential issued to the first computing device, and an electronic signature of the credential issuer.

16. The system of claim 15, wherein the credential issuance authority information further comprises the credential issuer information and credential valid period information.

17. The system of claim 16, wherein the credential issuance authority information is generated in at least one node included in the blockchain platform by executing a smart contract deployed on the blockchain platform according to a request of the credential issuer, and the generated credential issuance authority information is registered in the public ledger through distributed consensus by nodes included in the blockchain platform.

18. The system of claim 17, wherein the predetermined attribute item is one of Device Address, Device Extended Unique Identifier (EUI), IP Address, and Universally Unique Identifier (UUID).

* * * * *